(12) United States Patent
Sugiyama et al.

(10) Patent No.: US 9,731,590 B2
(45) Date of Patent: Aug. 15, 2017

(54) DRIVE DEVICE FOR HYBRID VEHICLE

(71) Applicant: TOYOTA JIDOSHA KABUSHIKI KAISHA, Toyota-shi, Aichi-ken (JP)

(72) Inventors: Masataka Sugiyama, Toyota (JP); Ryuji Ibaraki, Miyoshi (JP); Hiroaki Kimura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/105,202

(22) PCT Filed: Dec. 22, 2014

(86) PCT No.: PCT/IB2014/002856
§ 371 (c)(1),
(2) Date: Jun. 16, 2016

(87) PCT Pub. No.: WO2015/097529
PCT Pub. Date: Jul. 2, 2015

(65) Prior Publication Data
US 2016/0311306 A1    Oct. 27, 2016

(30) Foreign Application Priority Data
Dec. 26, 2013  (JP) .................................. 2013-269178

(51) Int. Cl.
*B60K 6/445*  (2007.10)
*B60K 6/26*  (2007.10)
(Continued)

(52) U.S. Cl.
CPC ............... *B60K 6/445* (2013.01); *B60K 6/26* (2013.01); *B60K 6/365* (2013.01); *B60K 6/40* (2013.01);
(Continued)

(58) Field of Classification Search
None
See application file for complete search history.

(56) References Cited

U.S. PATENT DOCUMENTS 3,986,413 A  * 10/1976  Stockton ............... F16H 47/085
475/136
2001/0011612 A1  8/2001  Takenaka et al.
(Continued)

FOREIGN PATENT DOCUMENTS

JP    2001-246953 A    9/2001
JP    2006-341849 A    12/2006
(Continued)

*Primary Examiner* — Colby M Hansen
(74) *Attorney, Agent, or Firm* — Oliff PLC (57) ABSTRACT

A first bearing device (68) rotatably supports a rotor shaft (30) of a motor (MG2) on a driven gear (24) side in an axial direction of the rotor shaft (30). A second bearing device (70) rotatably supports one (32) of a driven gear shaft (28) and an output shaft (32). The one (32) of the driven gear shaft (28) and the output shaft (32) is arranged radially inward of the other (28) one of the driven gear shaft (28) and the output shaft (32). A third bearing device (72) is arranged between an outer periphery of the one (32) of the driven gear shaft (28) and the output shaft (32) and an inner periphery of the rotor shaft (30) or an inner periphery of the other one (28) of the driven gear shaft (28) and the output shaft (32). The third bearing device (72) rotatably supports the one (32) of the driven gear shaft (28) and the output shaft (32).

10 Claims, 6 Drawing Sheets (51) Int. Cl.
*F16H 1/28* (2006.01)
*F16H 37/08* (2006.01)
*B60K 6/365* (2007.10)
*F16H 3/72* (2006.01)
*F16H 57/021* (2012.01)
*B60K 6/40* (2007.10)
*F16H 57/02* (2012.01)

(52) U.S. Cl.
CPC ............... *F16H 1/28* (2013.01); *F16H 3/728* (2013.01); *F16H 37/0833* (2013.01); *F16H 57/021* (2013.01); *B60Y 2200/92* (2013.01); *B60Y 2400/73* (2013.01); *B60Y 2400/80* (2013.01); *F16H 2037/0873* (2013.01); *F16H 2057/02034* (2013.01); *F16H 2057/02043* (2013.01); *F16H 2200/2005* (2013.01); *F16H 2200/2064* (2013.01); *Y02T 10/6239* (2013.01); *Y10S 903/906* (2013.01); *Y10S 903/91* (2013.01)

(56) References Cited

U.S. PATENT DOCUMENTS

| | | | |
|---|---|---|---|
| 2009/0100965 A1* | 4/2009 | Sanji | B60K 6/26 74/606 R |
| 2013/0023372 A1* | 1/2013 | Sada | B60K 6/40 475/149 |
| 2013/0184111 A1 | 7/2013 | Tsuchida et al. | |
| 2016/0311305 A1* | 10/2016 | Ichikawa | B60K 6/365 |
| 2016/0311306 A1* | 10/2016 | Sugiyama | B60K 6/40 |

FOREIGN PATENT DOCUMENTS

| | | |
|---|---|---|
| JP | 2012-017007 A | 1/2012 |
| JP | 2013-023036 A | 2/2013 |
| JP | 2015-123843 A | 7/2015 |
| NO | 2015/097510 A1 | 7/2015 |

* cited by examiner

DRIVE DEVICE FOR HYBRID VEHICLE

BACKGROUND OF THE INVENTION

1. Field of the Invention

The present invention relates to a drive device for a hybrid vehicle, and in particular to a structure of a drive device in which an engine and a motor are arranged on different rotational axes.

2. Description of Related Art

For a drive device for a hybrid vehicle that includes an engine and a motor, a structure has been suggested in which the engine and the motor are arranged on different rotational axes. For example, a hybrid drive device that is described in Japanese Patent Application Publication No. 2012-17007 (JP 2012-17007 A) or Japanese Patent Application Publication No. 2013-23036 (JP 2013-23036 A) is such an example. Since the engine and the motor are arranged on the different rotational axes as described above, an axial length of the drive device can be reduced when compared to a case where the engine and the motor are arranged on a common rotational axis.

SUMMARY OF THE INVENTION

A drive device 70 for a hybrid vehicle that is illustrated in FIG. 6 in JP 2012-17007 A is configured such that power from an engine 12 is transmitted to a second output shaft 22b via an electrical differential section 18, a chain 76, and a rotor shaft 22a and that power of a second motor MG2 is transmitted to the second output shaft 22b via the rotor shaft 22a. In addition, the rotor shaft 22a and the second output shaft 22b are connected in a manner that they are spline-fitted for power transmission therebetween. Meanwhile, a drive device 10 for a hybrid vehicle that is illustrated in FIG. 1 in JP 2013-23036 A is configured such that power from an engine is transmitted to drive wheels via a power distribution mechanism 28, a composite gear shaft 40, a counter shaft 18, and the like and that a drive force from a second motor MG2 is transmitted to the drive wheels via a power transmission shaft 20, the counter shaft 18, and the like. Supporting structures of rotational members in these JP 2012-17007 A and JP 2013-23036 are basically the same. However, a power transmission path in the hybrid drive device 70 for the vehicle in JP 2012-17007 A differs from a power transmission path in the drive device 10 for the hybrid vehicle in JP 2013-23036 A. In the hybrid drive device 70 for the vehicle in JP 2012-17007 A, the power transmission path is configured such that the power of the engine 12 is transmitted to drive wheels via the rotor shaft 22a of the second motor MG2. However, a structure for supporting this power transmission path is not described in JP 2012-17007 A. In JP 2012-17007 A, it is considered that a bearing device is newly installed to increase supporting rigidity of this power transmission path. However, it is difficult to newly install the bearing device due to a limited space.

The present invention provides a structure of a drive device for a hybrid vehicle, in which a space for newly installing a bearing device is not secured, and that supporting rigidity of a rotational shaft, to which power from an engine and power from a motor are transmitted, is increased, so as to enable suppression of vibration and noise, the drive device for a hybrid vehicle including an engine and a motor arranged on different rotational axes.

An aspect of the first invention is a drive device for a hybrid vehicle. The hybrid vehicle includes an engine, a drive wheel, and a motor arranged on a different rotational axis from a rotational axis of the engine. The drive device includes a driven gear shaft, a driven gear, an output shaft, a first bearing device, a second bearing device, and a third bearing device. The driven gear shaft is arranged to be rotatable about a rotational axis that is shared with a rotor shaft of the motor. The driven gear shaft is connected to the rotor shaft of the motor to allow power transmission between the driven gear shaft and the rotor shaft. A driven gear is configured to receive power from the engine. The driven gear is provided on the driven gear shaft. The output shaft is arranged to be rotatable about the rotational axis that is shared with the rotor shaft of the motor. The output shaft is arranged at a position where at least a portion of the output shaft overlaps the driven gear shaft in a radial direction of the output shaft. The output shaft is connected to the rotor shaft to allow power transmission between the output shaft and the rotor shaft. The output shaft is connected to the drive wheel to allow power transmission between the output shaft and the drive wheel. The first bearing device rotatably supports the rotor shaft of the motor on the driven gear side in an axial direction of the rotor shaft. The second bearing device rotatably supports one of the driven gear shaft and the output shaft. The one of the driven gear shaft and the output shaft is arranged radially inward of the other one of the driven gear shaft and the output shaft. The third bearing device is arranged between an outer periphery of the one of the driven gear shaft and the output shaft and an inner periphery of the rotor shaft or an inner periphery of the other one of the driven gear shaft and the output shaft. The third bearing device rotatably supports the one of the driven gear shaft and the output shaft.

According to the above aspect; the third bearing device is arranged between an outer periphery of the one of the driven gear shaft and the output shaft and the inner periphery of the rotor shaft or the inner periphery of the other one of the driven gear shaft and the output shaft. The one of the driven gear shaft and the output shaft is arranged radially inward of the other one of the driven gear shaft and the output shaft. Due to the arrangement of this third bearing device, the one of the driven gear shaft and the output shaft is supported by the third bearing device. Accordingly, supporting rigidity of the one rotational shaft is increased, and thus vibration and noise during power transmission can be suppressed. In addition, the third bearing device is arranged between the outer periphery of the one of the driven gear shaft and the output shaft and the inner periphery of the rotor shaft or the inner periphery of the other one of the driven gear shaft and the output shaft. Thus, due to the provision of the third bearing device, there is s no need to secure an additional space, and enlargement of the device is suppressed.

In the above aspect, a fourth bearing device may rotatably support the other one of the driven gear shaft and the output shaft. The fourth bearing device may be arranged at a position where at least a portion of the fourth bearing device overlaps the third bearing device in a radial direction. In this way, at least the portion of the fourth bearing device overlaps the third bearing device in the radial direction. Thus, supporting rigidity of the fourth bearing device is further increased.

In the above aspect, the fourth bearing device may be fixed to and supported by a case that is a non-rotational member. Just as described, since the fourth bearing device is supported by the case as the non-rotational member, the supporting rigidity of the fourth bearing device is high. Therefore, supporting rigidity of the third bearing device, which overlaps the fourth bearing device in the radial direction, is also increased.

In the above aspect, the third bearing device may be a needle bearing. Just as described, since the third bearing device is the needle bearing, the third bearing device can overlap the fourth bearing device in the radial direction with no need for the additional space. As a result, the supporting rigidity of the third bearing device is increased.

In the above aspect, the driven gear shaft may be arranged on an outer peripheral side of the output shaft. The output shaft is fitted to the rotor shaft and thus connected to the rotor shaft to allow power transmission therebetween. The output shaft may be supported by the second bearing device. The third bearing device may be arranged between the outer periphery of the output shaft and the inner periphery of the driven gear shaft. The driven gear shaft may rotatably be supported in a cantilevered state on the motor side in an axial direction of the driven gear shaft by the fourth bearing device. The fourth bearing device may include at least two bearings.

In the above aspect, the driven gear shaft may be arranged on an inner peripheral side of the output shaft. The driven gear shaft may be fitted to the rotor shaft and thus connected to the rotor shaft to allow the power transmission therebetween. The driven gear shaft may be supported by the second bearing device. The third bearing device may be arranged between an outer periphery of the driven gear shaft and an inner periphery of the output shaft. The output shaft may rotatably be supported in a cantilevered state on the motor side in the axial direction by the fourth bearing device. The fourth bearing device may include the at least two bearings.

In the above aspect, the fourth bearing device may be supported by a retainer. The retainer body may be fixed to the case as the non-rotational member. In this way, for example, when the retainer is manufactured by using cast iron, supporting rigidity of the retainer to support the fourth bearing device can further be increased. In addition, the retainer can be extended in an axial direction. Thus, a distance in the axial direction between the fourth bearing device and the driven gear can be reduced. In this way, a load that is applied to the fourth bearing device can be reduced, and, as a result, the fourth bearing device can be downsized.

In the above aspect, the driven gear shaft may be arranged on the outer peripheral side of the output shaft. The output shaft may be fitted to the rotor shaft and thus connected to the rotor shaft to allow the power transmission therebetween. The rotor shaft and the driven gear shaft may integrally be formed. When the driven gear shaft and the rotor shaft are configured as separate bodies, a bearing device for supporting each of the rotational shafts is necessary. However, in this way, these rotational shafts are integrally formed. Thus, one of the bearing devices need not be provided.

In the above aspect, the first bearing device and the third bearing device may be arranged such that at least a portion of the first bearing device overlaps at least a portion of the third bearing device in the radial direction. In this way, the third bearing device is arranged in the vicinity of the first bearing device. Accordingly, the supporting rigidity of the third bearing device is further improved, and thus the vibration and the noise during the power transmission are further suppressed.

In the above aspect, a thrust bearing may be arranged between the driven gear shaft and the output shaft in the axial direction of the driven gear shaft. The thrust bearing may be arranged to receive an axial load between the driven gear shaft and the output shaft in the axial direction of the driven gear shaft. In this way, the thrust load is transmitted between the driven gear shaft and the output shaft. Thus, the thrust load can be distributed to a bearing device that supports the driven gear shaft and to a bearing device that supports the output shaft. More specifically, each of the bearing devices can be structured to receive the thrust load that acts on one side in the axial direction. Thus, compared to a case where each of the bearing devices receives the thrust load that acts on both sides in the axial direction, each of the bearing devices can be downsized.

BRIEF DESCRIPTION OF THE DRAWINGS

Features, advantages, and technical and industrial significance of exemplary examples of the invention will be described below with reference to the accompanying drawings, in which like numerals denote like elements, and wherein.

DETAILED DESCRIPTION OF EMBODIMENTS

A detailed description will hereinafter be made on examples of the present invention with reference to the drawings. Noted that, in the following examples, the drawings are appropriately simplified or modified. Thus, a dimensional ratio, a shape, and the like of each component are not necessarily depicted in a precise manner.

Figure 1:
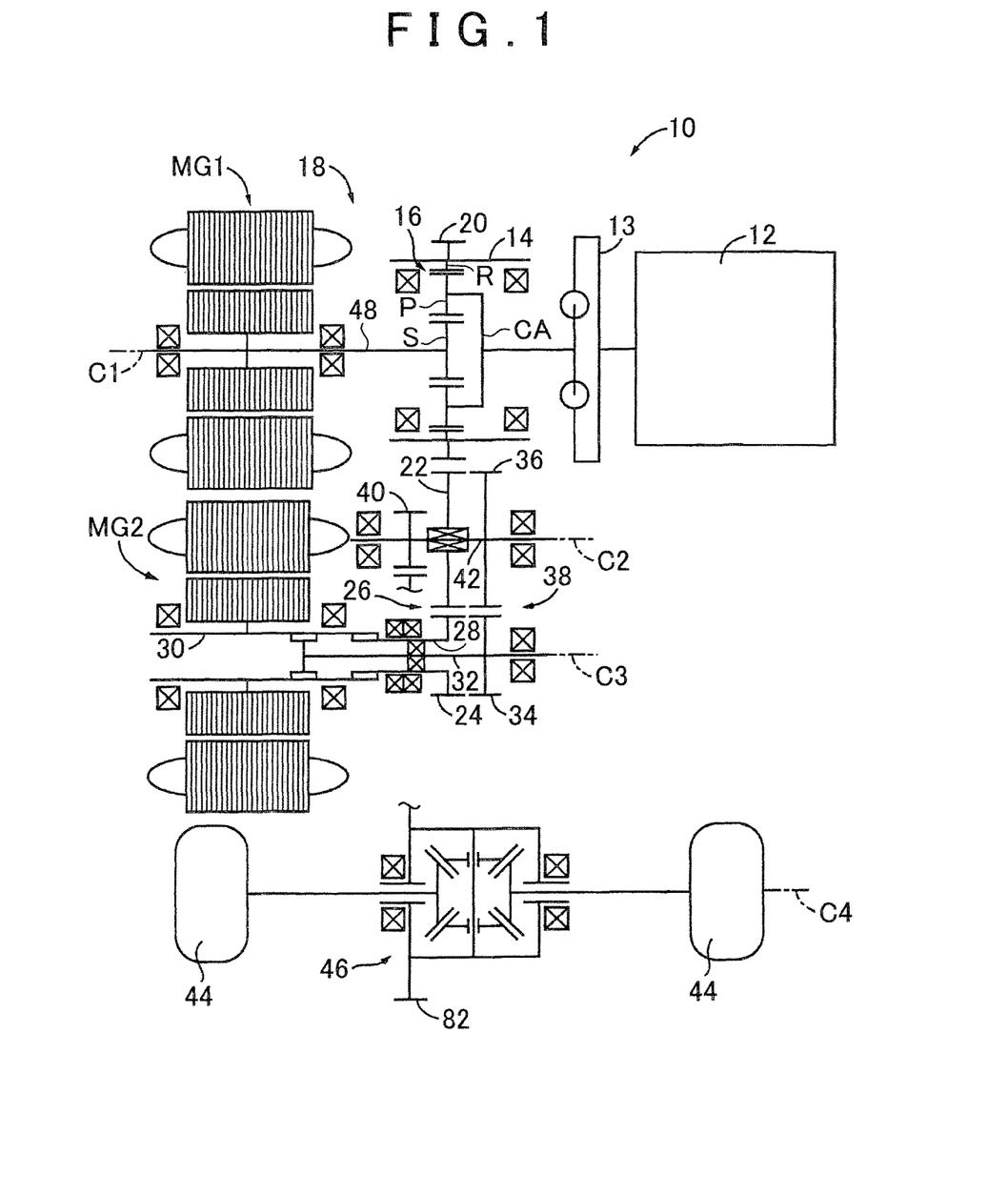
FIG. 1 is a schematic view for illustrating a configuration of a drive device for a hybrid vehicle that is an example of the present invention.

FIG. 1 is a schematic view for illustrating a configuration of a drive device 10 for a hybrid vehicle (hereinafter, a drive device 10) that is an example of the present invention. The drive device 10 has an engine 12 and a differential mechanism 16. The engine 12 is a main drive power source of the vehicle. The differential mechanism 16 splits power that is transmitted from the engine 12 via a damper device 13 to a first motor MG1 and an output member 14. The drive device 10 is configured by including: an electrical differential section 18, a second motor MG2, a speed increasing mechanism 26, a driven gear shaft 28, an output shaft 32, a speed reducing mechanism 38, a counter shaft 42, and a differential gear 46. The electrical differential section 18 controls a gear ratio when an operation state of the first motor MG1 thereof is controlled. The second motor MG2 is arranged on a different rotational axis from a rotational axis of the first motor MG1 and functions as a secondary drive power source. The speed increasing mechanism 26 is configured by including an idler gear 22, which meshes with an output gear 20 formed in the output member 14, and a driven gear 24, which meshes with the idler gear 22. The driven gear shaft 28 is formed with the driven gear 24. The output shaft 32 is coupled to a rotor shaft 30 of the second motor MG2. The speed reducing mechanism 38 is configured by including an output gear 34, which is formed on the output shaft 32, and a large-diameter gear 36, which meshes with the output gear 34. The counter shaft 42 is formed with the large-diameter gear 36 and a small-diameter gear 40. The differential gear 46 is configured to receive the power from the small-diameter gear 40 and transmits the power to right and left drive wheels 44. Noted that the second motor MG2 is an example of the motor of the present invention.

This drive device 10 is preferably used for a hybrid vehicle of front-engine, front-wheel-drive (FF) type. In addition, the drive device 10 has four rotational axes C1 to C4. More specifically, the drive device 10 has: the first rotational axis C1, on which the engine 12, the differential mechanism 16, and the first motor MG1 are arranged; the second rotational axis C2, on which the counter shaft 42, which is provided with the large-diameter gear 36 and the small-diameter gear 40, and the idler gear 22 are arranged; the third rotational axis C3, on which the driven gear shaft 28, which is formed with the driven gear 24, the second motor MG2, and the output shaft 32, which is formed with the output gear 34, are arranged; and the fourth rotational axis C4, on which the differential gear 46 is arranged. As described above, since the engine 12, the first motor MG1, and the differential mechanism 16 are arranged on the different rotational axis from the second motor MG2, an axial length of the drive device 10 is reduced.

The differential mechanism 16 functions as a power split device that splits the power, which is output from the engine 12, to the first motor MG1 and the output member 14. The differential mechanism 16 is formed of a planetary gear train of single pinion type that includes a sun gear S, a ring gear R, and a carrier CA. The sun gear S is coupled to a rotor shaft 48 of the first motor MG1. The ring gear R is provided in a coaxial manner with the sun gear S and is integrally provided on an inner periphery of the cylindrical output member 14. The carrier CA supports a pinion gear P, which meshes with the sun gear S and the ring gear R, so as to allow revolution and rotation thereof.

In addition, the power that has been transmitted to the output member 14 is then transmitted to the driven gear 24, which is arranged on the third rotational axis C3, via the idler gear 22, which meshes with the output gear 20 formed on an outer periphery of the output member 14. Since the driven gear shaft 28, on which the driven gear 24 is formed, is coupled to the output shaft 32 via the rotor shaft 30, the power that is transmitted to the driven gear 24 is transmitted to the right and left drive wheels 44 via the rotor shaft 30, the output shaft 32, the speed reducing mechanism 38, the small-diameter gear 40, and the differential gear 46.

Figure 2:
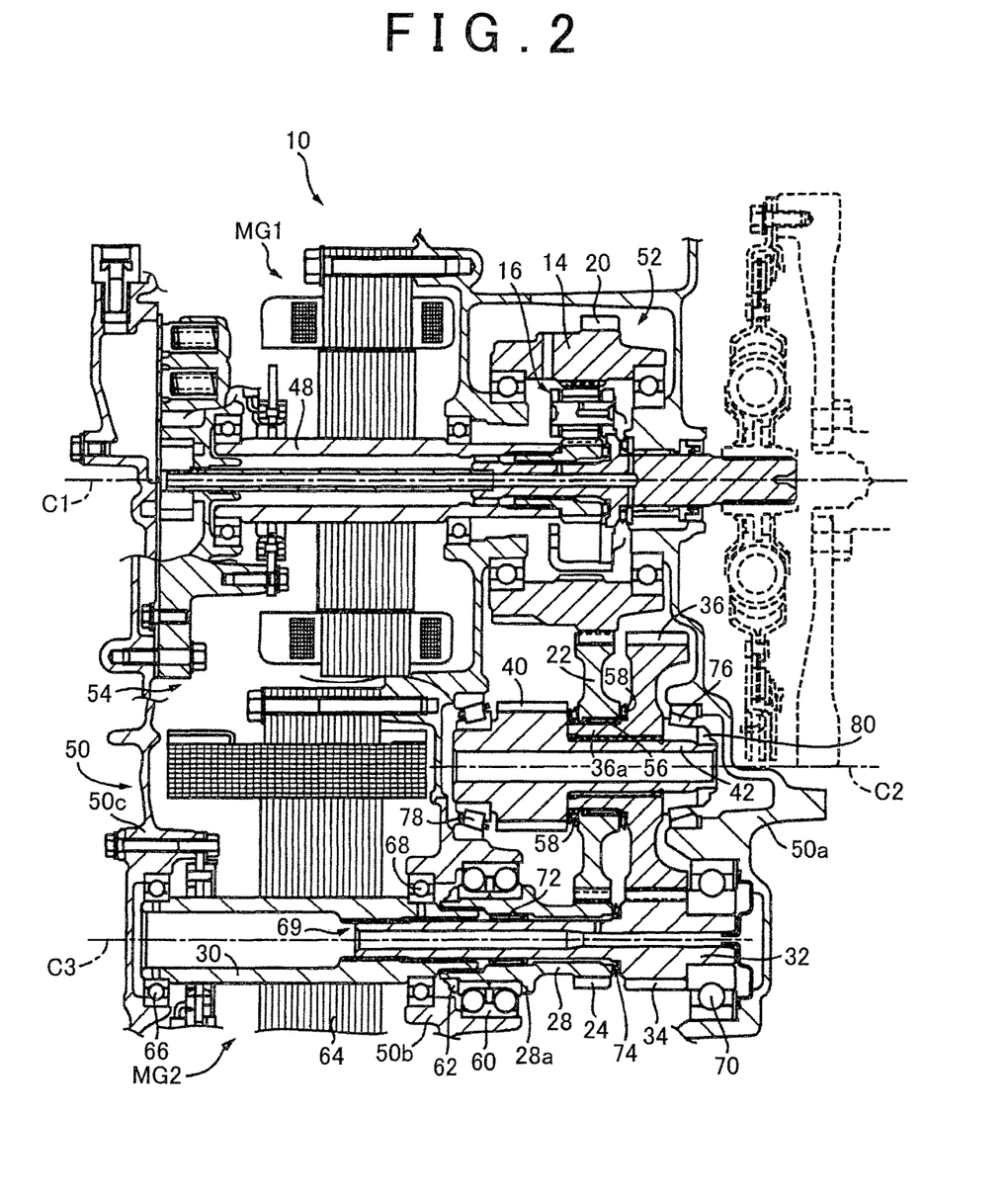
FIG. 2 is a cross-sectional view in which the configuration of a portion of the drive device in FIG. 1 that is arranged around a first rotational axis, a second rotational axis, and a third rotational axis is shown in the same plane.

FIG. 2 is a cross-sectional view in which the configuration of a portion of the drive device 10 in FIG. 1 that is arranged around the first rotational axis C1, the second rotational axis C2, and the third rotational axis C3 is shown in the same plane. Also, as shown in FIG. 2, the engine 12, the differential mechanism 16, and the first motor MG 1 are arranged to be rotatable about the first rotational axis C1. The counter shaft 42 is arranged to be rotatable about the second rotational axis C2. The driven gear shaft 28, the second motor MG2 (the rotor shaft 30), and the output shaft 32 are arranged to be rotatable about the third rotational axis C3.

These members are housed in a case 50 that is a non-rotational member. In the case 50, a gear chamber 52 and a motor chamber 54 are formed. The gear chamber 52 houses the differential mechanism 16, the counter shaft 42, the output shaft 32, and the like. The motor chamber 54 houses the first motor MG1 and the second motor MG2. The case 50 is integrally constituted by connecting a first case 50a, a second case 50b, and a third case 50c. The bottomed cylindrical first case 50a primarily forms the gear chamber 52. The cylindrical second case 50b is configured by including a partition wall that partitions the gear chamber 52 and the motor chamber 54. The third case 50c primarily forms the motor chamber 54.

The power of the engine 12 is split to the first motor MG1 and the output member 14 via the differential mechanism 16. The output member 14 is formed in an annular shape, and the output gear 20 is formed on an outer periphery thereof. The output gear 20 meshes with meshing teeth of the idler gear 22, which is arranged to be rotatable about the second rotational axis C2. The idler gear 22 is arranged on an outer peripheral side of a cylindrical section 36a that is formed in the counter shaft 42 and the large-diameter gear 36. A needle bearing 56 that supports the idler gear 22 and the large-diameter gear 36 to allow relative rotation between the idler gear 22 and the large-diameter gear 36 is arranged on an inner periphery of the idler gear 22. Furthermore, a thrust bearing 58 is arranged between the idler gear 22 and the small-diameter gear 40 in an axial direction of the counter shaft 42, and is also arranged between the idler gear 22 and the large-diameter gear 36 in the axial direction of the counter shaft 42. Since the inner periphery of the idler gear 22 is supported by the needle bearing 56 and the thrust bearings 58, the idler gear 22 can rotate relative to the counter shaft 42.

Since the meshing teeth of the idler gear 22 mesh with meshing teeth of the driven gear 24, the power from the engine 12 is transmitted to the driven gear 24 via the idler gear 22. The driven gear 24 is provided at one end in an axial direction of the driven gear shaft 28 that can rotate about the third rotational axis C3. The driven gear shaft 28 is in a cylindrical shape and arranged to be rotatable about the third rotational axis C3, which is shared with the second motor MG2. In addition, the output shaft 32 penetrates radially inward of the driven gear shaft 28. In the driven gear shaft 28, a double-row angular bearing 60 is arranged on the second motor side in the axial direction of the driven gear shaft 28. The driven gear shaft 28 is rotatably supported in a cantilevered state by this double-row angular bearing 60. The double-row angular bearing 60 is fixed to and supported by the second case 50b. The double-row angular bearing 60 is configured by including two balls that are aligned in an axial direction of the double-row angular bearing 60, and the driven gear shaft 28 is substantially supported by the two bearings. Just as described, supporting rigidity of the driven gear shaft 28 is secured by the double-row angular bearing 60, which corresponds to the two bearings. Noted that the double-row angular bearing 60 is an example of the fourth bearing device of the present invention.

The driven gear shaft 28 is provided with a flange section 28a that protrudes in a radial direction of the driven gear shaft 28. It is configured such that an end of the flange section 28a abuts against an inner wheel of the double-row angular bearing 60. Furthermore, the double-row angular bearing 60 is fastened by a nut 62 from an opposite side from a side on which the double-row angular bearing 60 abuts against the flange section 28a. Accordingly, the double-row angular bearing 60 is applied with a preload that acts in the axial direction thereof. A supporting state of the double-row angular bearing 60 is appropriately adjusted by adjusting this preload. An inner periphery of an end in the axial direction of the driven gear shaft 28 that is on an opposite side from the driven gear 24 is provided with inner peripheral teeth that are spline-fitted to the rotor shaft 30 of the second motor MG2. An outer peripheral end on the first case 50a side in an axial direction of the rotor shaft 30 is provided with outer peripheral teeth that are spline-fitted to the driven gear shaft 28. That is, the outer peripheral teeth are spline-fitted to the inner peripheral teeth of the driven gear shaft 28. Accordingly, the driven gear shaft 28 and the rotor shaft 30 are configured to integrally rotate with each other. In other words, the driven gear shaft 28 is connected to the rotor shaft 30 of the second motor MG2 to allow power transmission therebetween.

The rotor shaft 30 has a cylindrical shape and is supported to be rotatable about the third rotational axis C3. An end on the third case 50c side in the axial direction of the rotor shaft 30 is rotatably supported by a ball bearing 66. The first case 50a side in the axial direction of the rotor shaft 30 (an output side of the second motor MG2, driven gear 24 side) is rotatably supported by a ball bearing 68. Just as described, the rotor shaft 30 is rotatably supported by the ball bearing 66 and the ball bearing 68. In addition, a rotor 64, which constitutes the second motor MG2, is connected to an outer periphery of the rotor shaft 30. Accordingly, when the second motor MG2 is driven (rotates), the rotor shaft 30 rotates along with the rotor 64. Furthermore, a fitted section 69 is provided that connects the rotor shaft 30 and the output shaft 32 to allow power transmission therebetween when outer peripheral teeth formed on an outer peripheral end of the output shaft 32 are spline-fitted to inner peripheral teeth formed on the inner peripheral side of the rotor shaft 30. Noted that the ball bearing 68 is an example of the first bearing device of the present invention.

The output shaft 32 has a cylindrical shape and is arranged to be rotatable about the third rotational axis C3, which is shared with the rotor shaft 30 of the second motor MG2. In addition, the output shaft 32 is arranged radially inward of the driven gear shaft 28, and a portion in a radial direction of the output shaft 32 overlaps the driven gear shaft 28. The first case 50a side in an axial direction of the output shaft 32 protrudes from the driven gear shaft 28 in the axial direction, and an end of the output shaft 32 is rotatably supported by a ball bearing 70. A needle bearing 72 that rotatably supports the output shaft 32 is arranged between an outer periphery of the output shaft 32 and an inner periphery of the driven gear shaft 28. In the axial direction of the output shaft 32, the needle bearing 72 is arranged at a position where it overlaps the driven gear shaft 28 and the double-row angular bearing 60 in a radial direction. In this way, an opposite side from the ball bearing 70 in the axial direction of the output shaft 32 is rotatably supported by the needle bearing 72. More specifically, one end in the axial direction of the output shaft 32 is supported by the needle bearing 72 via the double-row angular bearing 60 and the driven gear shaft 28. In addition, the output gear 34 that meshes with the large-diameter gear 36 is provided on the outer periphery on the first case 50a side in the axial direction of the output shaft 32. This output gear 34 is connected to the drive wheels 44 via a differential gear 46 and the like, so as to allow the power transmission to the drive wheels 44. Furthermore, a thrust bearing 74 is arranged between the end on the side, on which the driven gear 24 is provided, of the driven gear shaft 28 and the output gear 34. The thrust bearing 74 receives an axial load between the end on the side, on which the driven gear 24 is provided, of the driven gear shaft 28 and the output gear 34. Noted that the ball bearing 70 is an example of the second bearing device of the present invention. The needle bearing 72 is an example of the third bearing device of the present invention.

The large-diameter gear 36 is supported to be rotatable about the second rotational axis C2. An inner periphery of the large-diameter gear 36 is spline-fitted to the counter shaft 42. The counter shaft 42 has a cylindrical shape, and both ends in the axial direction of the counter shaft 42 are rotatably supported by bearings. More specifically, in the axial direction of the counter shaft 42, an end on the first case 50a side of the counter shaft 42 is rotatably supported by a tapered roller bearing 76. In the axial direction of the counter shaft 42, an end on the third case 50c side of the counter shaft 42 is rotatably supported by a tapered roller bearing 78. In addition, the end on the tapered roller bearing 76 side of the counter shaft 42 is fastened by a nut 80. Accordingly, the preload that acts in a thrust direction is appropriately applied to the counter shaft 42. Just as described, the counter shaft 42 is supported by the tapered roller bearing 76 and the tapered roller bearing 78. Furthermore, the small-diameter gear 40 is provided on the tapered roller bearing 78 side in the axial direction of the counter shaft 42. The small-diameter gear 40 meshes with a final driven gear 82 (see FIG. 1) of the differential gear 46 in FIG. 1.

Features of the drive device 10, which is configured as described above, will be described. In the drive device 10, the power of the engine, which is transmitted to the driven gear 24, is transmitted in an order of the driven gear shaft 28, the rotor shaft 30, the fitted section 69, and the output shaft 32. Furthermore, the power of the engine is transmitted to the counter shaft 42, which is connected to the drive wheels 44 to allow the power transmission thereto. Just as described, in the drive device 10, a power transmission path is configured that the power of the engine 12 is transmitted in the order of the driven gear shaft 28, the rotor shaft 30, the fitted section 69, and the output shaft 32. In order to suppress vibration and noise during power transmission, supporting rigidity of each of these rotational shafts, to which the power is transmitted, needs to be increased. Here, the driven gear shaft 28 is supported in the cantilevered state by the double-row angular bearing 60. Noted that, since the double-row angular bearing 60 is configured by including the two bearings, the driven gear shaft 28 is substantially supported by the two bearings, and thus can secure the high supporting rigidity. Meanwhile, since the rotor shaft 30 is rotatably supported by the ball bearing 66 and the ball bearing 68, the supporting rigidity thereof is also secured.

The output shaft 32 is supported by the needle bearing 72 and the ball bearing 70. Noted that the needle bearing 72 supports the output shaft 32 via the driven gear shaft 28 and the double-row angular bearing 60. Then, since the needle bearing 72 is arranged at the position where it overlaps these driven gear shaft 28 and double-row angular bearing 60 in the radial direction of the needle bearing 72, the needle bearing 72 is arranged immediately below these members with high rigidity (the driven gear shaft 28 and the double-row angular bearing 60). Accordingly, the supporting rigidity of the needle bearing 72 is also secured. As described above, since the driven gear shaft 28, the rotor shaft 30, and the output shaft 32, to which the power is transmitted from the engine 12, are each supported independently via the each bearing, the supporting rigidity thereof is increased. Thus, the vibration and the noise that are generated when the power is transmitted from the engine 12 to these rotational shafts are suppressed. In addition, the needle bearing 72, which supports the output shaft 32, is arranged between the inner periphery of the driven gear shaft 28 and the outer periphery of the output shaft 32. Thus, when the output shaft 32 is supported, there is no need to secure a space to arrange an additional bearing.

In the drive device 10, the driven gear shaft 28 is formed as a separate body from the rotor shaft 30. Thus, the double-row angular bearing 60 for supporting this driven gear shaft 28 is provided. This double-row angular bearing 60 is arranged at the position where it overlaps the small-diameter gear 40 in the radial direction of the double-row angular bearing 60. A diameter of a gear in the small-diameter gear 40 is small. Thus, a space can easily be formed on the outer peripheral side of the small-diameter gear 40 (a space on the outer peripheral side of the small-diameter gear 40 is larger than a space that is formed when a large-diameter gear is provided). For this reason, the double-row angular bearing 60 is arranged at the position where it overlaps the small-diameter gear 40 in the radial direction of the small-diameter gear 40. In this way, the space on the outer peripheral side of the small-diameter gear 40 is effectively used, and enlargement of the device, which is caused by providing the double-row angular bearing 60, is prevented.

In the drive device 10, each of the meshing gears for transmitting the power is formed of helical teeth, and a thrust load is generated thereon when the power is transmitted. In addition, a direction of the thrust load that is generated when the power is transmitted from the engine side and a direction of the thrust load that is generated when the power is transmitted from the drive wheels 44 side are reversed. Here, the double-row angular bearing 60, which supports the driven gear shaft 28, can receive the right and left thrust loads. In this case, manufacturing man-hours are increased. It is because an outer wheel of the double-row angular bearing 60 is press-fitted to the case to inhibit movement in the axial direction of the double-row angular bearing 60, because a snap ring for inhibiting the movement of the outer wheel in the axial direction is newly set, or the like. Furthermore, the double-row angular bearing 60 is enlarged since it is designed to retain the right and left thrust loads. The same applies to the ball bearing 70, which supports the output shaft 32. In the case where the ball bearing 70 receives the right and left thrust loads, the manufacturing man-hours are increased, and the bearing is enlarged.

On the contrary, it is configured such that the thrust bearing 74 is arranged between the driven gear shaft 28 and the output shaft 32 and that the thrust loads generated on both of the rotational shafts are transmitted therebetween via the thrust bearing 74. Furthermore, the double-row angular bearing 60 and the ball bearing 70 are configured such that the thrust load is split thereto in accordance with the direction of the load. For example, when the thrust load that acts on the ball bearing 70 side (the right side in the drawing) is generated on each of the driven gear shaft 28 and the output shaft 32 during the power transmission, it is set such that the thrust load generated on the driven gear shaft 28 is transmitted to the output shaft 32 via the thrust bearing 74 and that the ball bearing 70 receives the thrust loads generated on these driven gear shaft 28 and output shaft 32. On the contrary, when the thrust load that acts on the double-row angular bearing 60 side (the left side in the drawing) is generated on each of the driven gear shaft 28 and the output shaft 32, it is set such that the thrust load generated on the output shaft 32 is transmitted to the driven gear shaft 28 via the thrust bearing 74 and that the double-row angular bearing 60 receives the thrust loads generated on these driven gear shaft 28 and output shaft 32. In this way, it is designed such that the thrust loads that are generated on the driven gear shaft 28 and the output shaft 32 are respectively distributed to the double-row angular bearing 60 and the ball bearing 70 and that each of the double-row angular bearing 60 and the ball bearing 70 receives the thrust load that acts only on one side in the axial direction. Accordingly, enlargement of the double-row angular bearing 60 and that of the ball bearing 70 are prevented. In addition, neither the double-row angular bearing 60 nor the ball bearing 70 is press-fitted to the case 50, and there is no need to provide the snap ring for inhibiting the movement in the axial direction. Thus, an increase in the manufacturing man-hours is prevented. Noted that, since the driven gear shaft 28 and the double-row angular bearing 60 are assembled in advance on a different assembly line, the increase in man-hours of the main manufacturing line is suppressed.

As described above, according to this example, the portion of the output shaft 32 that protrudes from the driven gear shaft 28 in the axial direction is rotatably supported by the ball bearing 70. The output shaft 32 is rotatably supported by the needle bearing 72, which is interposed between the outer periphery of the output shaft 32 and the inner periphery of the driven gear shaft 28. Just as described, since the output shaft 32 is supported by the ball bearing 70 and the needle bearing 72, the supporting rigidity of the output shaft 32 is increased, and thus the vibration and the noise during the power transmission can be suppressed. In addition, since the needle bearing 72 is interposed between the inner periphery of the driven gear shaft 28 and the outer periphery of the output shaft 32, the provision of the needle bearing 72 eliminates the need to secure a space to newly arrange a bearing, and the enlargement of the drive device 10 is thus suppressed.

In addition, according to this example, the driven gear shaft 28 is rotatably supported in the cantilevered state by the double-row angular bearing 60, which is configured by including the two bearings. Accordingly, the high supporting rigidity can also be secured for the driven gear shaft 28. Since the double-row angular bearing 60 is fixed to and supported by the second case 50b (the case 50), which is the non-rotational member, the supporting rigidity thereof is also high.

Furthermore, according to this example, since the needle bearing 72 is arranged at the position where it overlaps the double-row angular bearing 60 in the radial direction of the needle bearing 72, the needle bearing 72 is arranged in the vicinity of the double-row angular bearing 60. Thus, the supporting rigidity of the needle bearing 72 is further increased, and the vibration and the noise during the power transmission can further be suppressed.

Moreover, according to this example, since the thrust load is transmitted between the driven gear shaft 28 and the output shaft 32 Via the thrust bearing 74, the thrust load can be distributed to the double-row angular bearing 60, which supports the driven gear shaft 28, and the ball bearing 70, which supports the output shaft 32. Then, each of the double-row angular bearing 60 and the ball bearing 70 can have such a structure that each of the double-row angular bearing 60 and the ball bearing 70 receives the thrust load that acts on the one side in the axial direction. Compared to the case where each of the double-row angular bearing 60 and the ball bearing 70 receives the thrust load that acts on both sides in the axial direction, the double-row angular bearing 60 and the ball bearing 70 can be downsized.

Next, another example of the present invention will be described. Noted that components in the following description that are common with those in the above-described example are denoted by the same reference numerals, and the description thereof will not be made.

Figure 3:
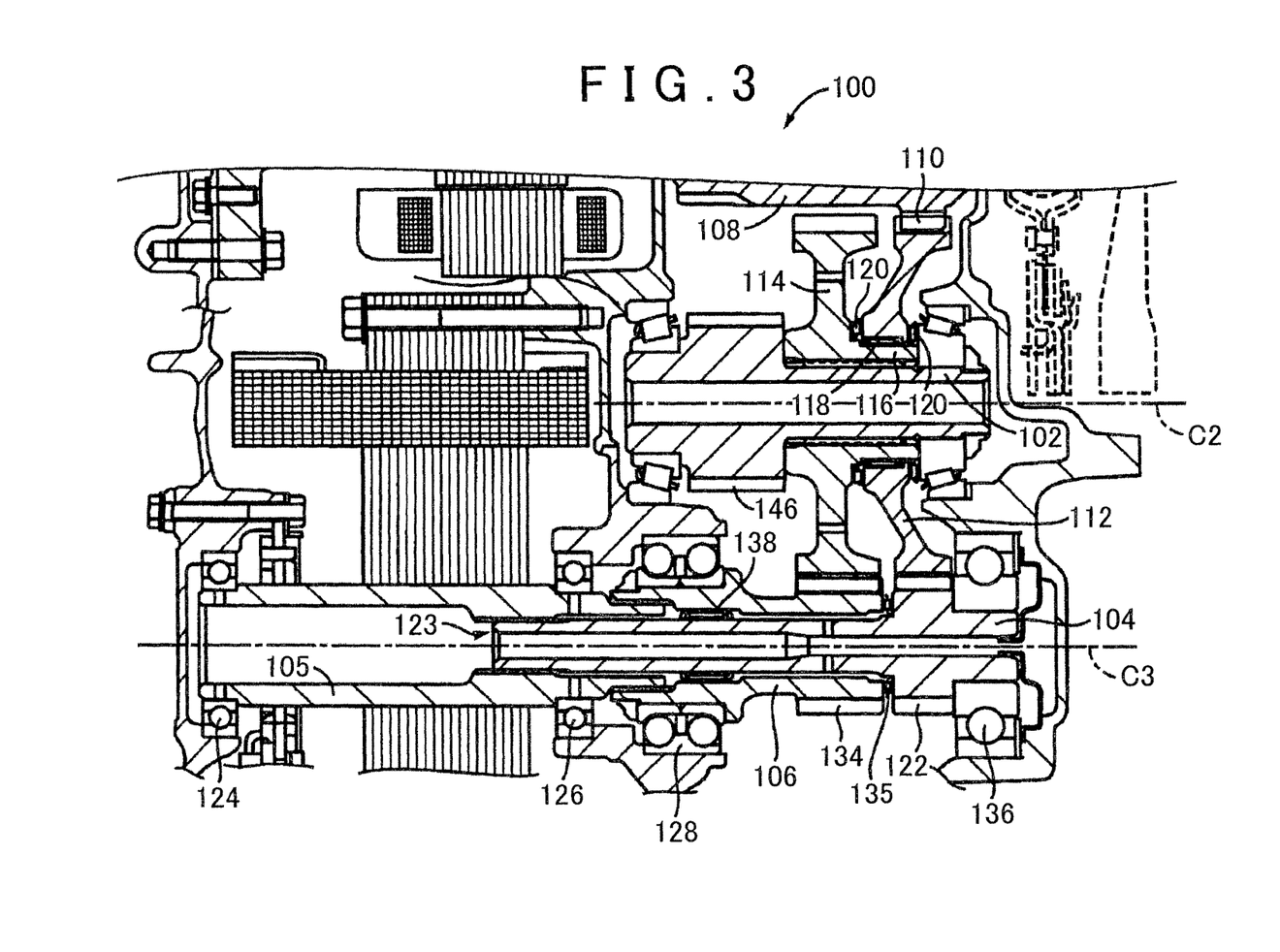
FIG. 3 is a cross-sectional view of a drive device that is another example of the present invention.

FIG. 3 is a cross-sectional view of a drive device 100 for a hybrid vehicle (a drive device 100) that is another example of the present invention and corresponds to FIG. 2 of the above-described example. When the drive device 100 in FIG. 3 is compared to the above-described drive device 10, a configuration around the first rotational axis C1 is basically the same, and the configuration around the second rotational axis C2 and the third rotational axis C3 differ. In this example, the configuration around the first rotational axis C1 is not shown in the drawing, and the description thereof will not be made. The description will be centered on the configuration around the second rotational axis C2 and the third rotational axis C3.

Also, in the drive device 100, the engine 12, the differential mechanism 16, and the first motor MG1 are arranged around the first rotational axis C1 (not shown), a counter shaft 102 is arranged to be rotatable about around the second rotational axis C2, and a driven gear shaft 104, the second motor MG2 (a rotor shaft 105), and an output shaft 106 are arranged to be rotatable about around the third rotational axis C3. Noted that, in the drive device 100, the driven gear shaft 104 is arranged on an inner peripheral side of the output shaft 106.

An output gear 110 of an output member 108, to which the power from the engine 12 is transmitted, meshes with meshing teeth of an idler gear 112 that is arranged to be rotatable about around the second rotational axis C2. The idler gear 112 is arranged on an outer peripheral side of a cylindrical section 116 that is formed in each of the counter shaft 102 and a large-diameter gear 114. A needle bearing 118 that supports the idler gear 112 and the counter shaft 102 to allow relative rotation therebetween is arranged on an inner periphery of the idler gear 112, and a thrust bearing 120 is arranged on both ends in an axial direction. Since the inner periphery of the idler gear 112 is supported by the needle bearing 118 and the thrust bearings 120, the idler gear 112 can rotate relative to the counter shaft 102.

The meshing teeth of the idler gear 112 mesh with meshing teeth of a driven gear 122 that is arranged around the third rotational axis C3. Accordingly, the power from the engine 12 is transmitted to the driven gear 122 via the output gear 110 and the idler gear 112. The driven gear 122 is provided at one end side (the first case 50a side) in an axial direction of the driven gear shaft 104, which is arranged around the third rotational axis C3. In addition, the driven gear shaft 104 is arranged on the inner peripheral side of each of the rotor shaft 105 and the output shaft 106. Noted that a support mechanism of the driven gear shaft 104 will be described below. On another end side (the third case 50c side) in the axial direction of the driven gear shaft 104, outer teeth are provided such that the driven gear shaft 104 is spline-fitted to the rotor shaft 105. Since inner peripheral teeth that are provided on the inner peripheral side of the rotor shaft 105 are spline-fitted to these outer peripheral teeth of the driven gear shaft 104, a fitted section 123 that connects the driven gear shaft 104 and the rotor shaft 105 to allow the power transmission therebetween is provided.

The rotor shaft 105 has a cylindrical shape and is arranged to be rotatable about around the third rotational axis C3. The rotor shaft 105 is rotatably supported by a ball bearing 124 at an end on the third case 50c side in an axial direction of the rotor shaft 105. The rotor shaft 105 is also rotatably supported by a ball bearing 126 on the first case 50a side (the output side of the motor, the driven gear side) in the axial direction of the rotor shaft 105. As described above, the rotor shaft 105 is rotatably supported by the ball bearing 124 and the ball bearing 126. In addition, the rotor 64 that constitutes the second motor MG2 is connected to an outer periphery of the rotor shaft 105. Accordingly, when the second motor MG2 is driven (rotates), the rotor shaft 105 is rotated along with the rotor 64. Furthermore, outer peripheral teeth, by which the rotor shaft 105 is spline-fitted to the output shaft 106, are provided at an outer peripheral end on the first case 50a side in the axial direction of the rotor shaft 105. Noted that the ball bearing 126 is an example of the first bearing device of the present invention.

The outer peripheral teeth that are provided in the rotor shaft 105 are spline-fitted to inner peripheral teeth that are provided on one end side (the third case 50c side) in an axial direction of the output shaft 106 having a cylindrical shape. Thus, the rotor shaft 105 and the output shaft 106 are connected in a manner capable of the power transmission therebetween. The output shaft 106 is rotatably supported around the third rotational axis C3 and arranged on an outer peripheral side of the driven gear shaft 104. Thus, the output shaft 106 overlaps the driven gear shaft 104 in a radial direction of the output shaft 106. The output shaft 106 is rotatably supported in a cantilevered state by a double-row angular bearing 128. The double-row angular bearing 128 is configured by including two balls that are fixed to and supported by the second case 50b and are aligned in the axial direction. Since the output shaft 106 is supported by the substantially two bearings, supporting rigidity of the output shaft 106 is secured. Noted that the double-row angular bearing 128 is an example of the fourth bearing device of the present invention.

An output gear 134 is provided on an outer periphery on an opposite side from the second motor MG2 side in the axial direction of the output shaft 1.06. A thrust bearing 135 is arranged between this output gear 134 and the driven gear 122, a thrust load that is generated in one rotational shaft of the driven gear shaft 104 and the output shaft 106 is transmitted to another rotational shaft thereof via the thrust bearing 135. Meanwhile, similar to the above-described example, a ball bearing 136, which will be described below, and the double-row angular bearing 128 are configured such that they can only receive the thrust load that acts on one side in the axial direction.

Next, the support mechanism of the driven gear shaft 104 will be described. The driven gear shaft 104 is rotatably supported around the third rotational axis C3. The first case 50a side in the axial direction of the driven gear shaft 104 protrudes from the output shaft 106 in the axial direction, and an outer peripheral end of the driven gear shaft 104 is supported by the ball bearing 136. A needle bearing 138 that rotatably supports the driven gear shaft 104 is arranged between an outer periphery of the driven gear shaft 104 and an inner periphery of the output shaft 106. The driven gear shaft 104 is supported by this needle bearing 138 via the double-row angular bearing 128 and the output shaft 106. The needle bearing 138 is arranged at a position where it overlaps the output shaft 106 and the double-row angular bearing 128 in a radial direction of the needle bearing 138. Here, since rigidity of each of the double-row angular bearing 128 and the output shaft 106 is high, supporting rigidity of the needle bearing 138, which is arranged immediately below (on the inner peripheries of) the double-row angular bearing 128 and the output shaft 106, is also increased. Noted that the ball bearing 136 is an example of the second bearing device of the present invention. The needle bearing 138 is an example of the third bearing device of the present invention.

The same effects as those obtained by the drive device 10 in the above-described example can be obtained by the drive device 100 in this example. For example, in the drive device 100, the driven gear shaft 104 and the rotor shaft 105 are spline-fitted to each other, and the rotor shaft 105 and the output shaft 106 are also spline-fitted to each other. Thus, in order to suppress the vibration and the noise during the power transmission, the supporting rigidity of each of the rotational shafts needs to be increased. Here, the driven gear shaft 104 is supported by the ball bearing 136 and the needle bearing 138, the rotor shaft 105 is supported by the ball bearing 124 and the ball bearing 126, and the output shaft 106 is supported by the double-row angular bearing 128, which is configured by including the two bearings. As described above, since each of the rotational shafts, to which the power from the engine 12 is transmitted, is independently supported, each of the rotational shafts can have the high supporting rigidity. Therefore, the vibration and the noise during the power transmission are suppressed. In addition, since the needle bearing 138, which supports the driven gear shaft 104, is arranged between the outer periphery of the driven gear shaft 104 and the inner periphery of the output shaft 106, a large space for arranging a bearing to support the driven gear shaft 104 is not required.

In the drive device 100 of this example, since the output shaft 106 is arranged on the outer peripheral side of the driven gear shaft 104, a diameter of the output shaft 106 can easily be increased in comparison with the drive device 10 in which the above-described output shaft 32 is arranged on the inner peripheral side of the driven gear shaft 28. Accordingly, since shaft strength of the output shaft 106 can easily be secured, the drive device 100 is suitable for a vehicle to which large torque is transmitted. Noted that, since the driven gear shaft 28 is arranged on the outer peripheral side of the output shaft 32 in the drive device 10 of the above-described example, the driven gear 24, which meshes with the idler gear 22, is arranged on the second motor MG2 side from the output gear 34 in the axial direction. Here, since the idler gear 22 also meshes with the output gear 20 of the output member 14, which is arranged to be rotatable around the first rotational axis C1, the output gear 20 is arranged at the center or near the center in the axial direction of the output member 14 (see FIG. 2). Accordingly, there is no need to extend the output member 108 in the axial direction and arrange the output gear 110 at an end in the axial direction as in the drive device 100. Thus, the axial length of the output member 14 is reduced in the drive device 10. As described above, since the output member 14 is shortened in the axial direction, the drive device 10 can be configured to be compact.

In addition, since the rotor shaft 105 and the output shaft 106 are configured as separate bodies, the double-row angular bearing 128 for supporting this output shaft 106 is provided. This double-row angular bearing 128 is arranged at a position where it overlaps a small-diameter gear 146 in the radial direction, the small-diameter gear 146 being formed on the counter shaft 102. In this way, enlargement of the device, which is caused by arrangement of the double-row angular bearing 128 in a space on an outer peripheral side of the small-diameter gear 146 and by provision of the double-row angular bearing 128, is prevented.

Furthermore, it is structured that the thrust load generated in the one of the driven gear shaft 104 and the output shaft 106 is transmitted to the other thereof via the thrust bearing 135 and that the thrust load is distributed to the ball bearing 136 and the double-row angular bearing 128. Accordingly, enlargement of the bearings is suppressed. Moreover, since there is no need to adopt a structure that inhibits axial movement of the bearings, the increase in the manufacturing man-hours is also suppressed.

As described above, according to this example, the driven gear shaft 104, which is arranged on the inner peripheral side, is connected to the rotor shaft 105 via the fitted section 123. Here, the portion of the driven gear shaft 104 that protrudes from the output shaft 106 in the axial direction is supported by the ball bearing 136, and the driven gear shaft 104 is also supported by the needle bearing 138 that is interposed between the inner periphery of the output shaft 106 and the outer periphery of the driven gear shaft 104. Accordingly, since the driven gear shaft 104 is supported by the needle bearing 138 and the ball bearing 136, the supporting rigidity thereof is increased, and thus the vibration and the noise, during the power transmission can be suppressed. Furthermore, the needle bearing 138 is arranged between the inner periphery of the output shaft 106 and the outer periphery of the driven gear shaft 104. Thus, a space for arranging a bearing is not secured, and the enlargement of the drive device 100 is also suppressed.

In addition, according to this example, since the output shaft 106 is supported by the double-row angular bearing 128, which is configured by including the two bearings, the high supporting rigidity thereof is obtained. As described above, since both of the driven gear shaft 104 and the output shaft 106 have the high supporting rigidity, the vibration and the noise during the power transmission are suppressed.

Figure 4:
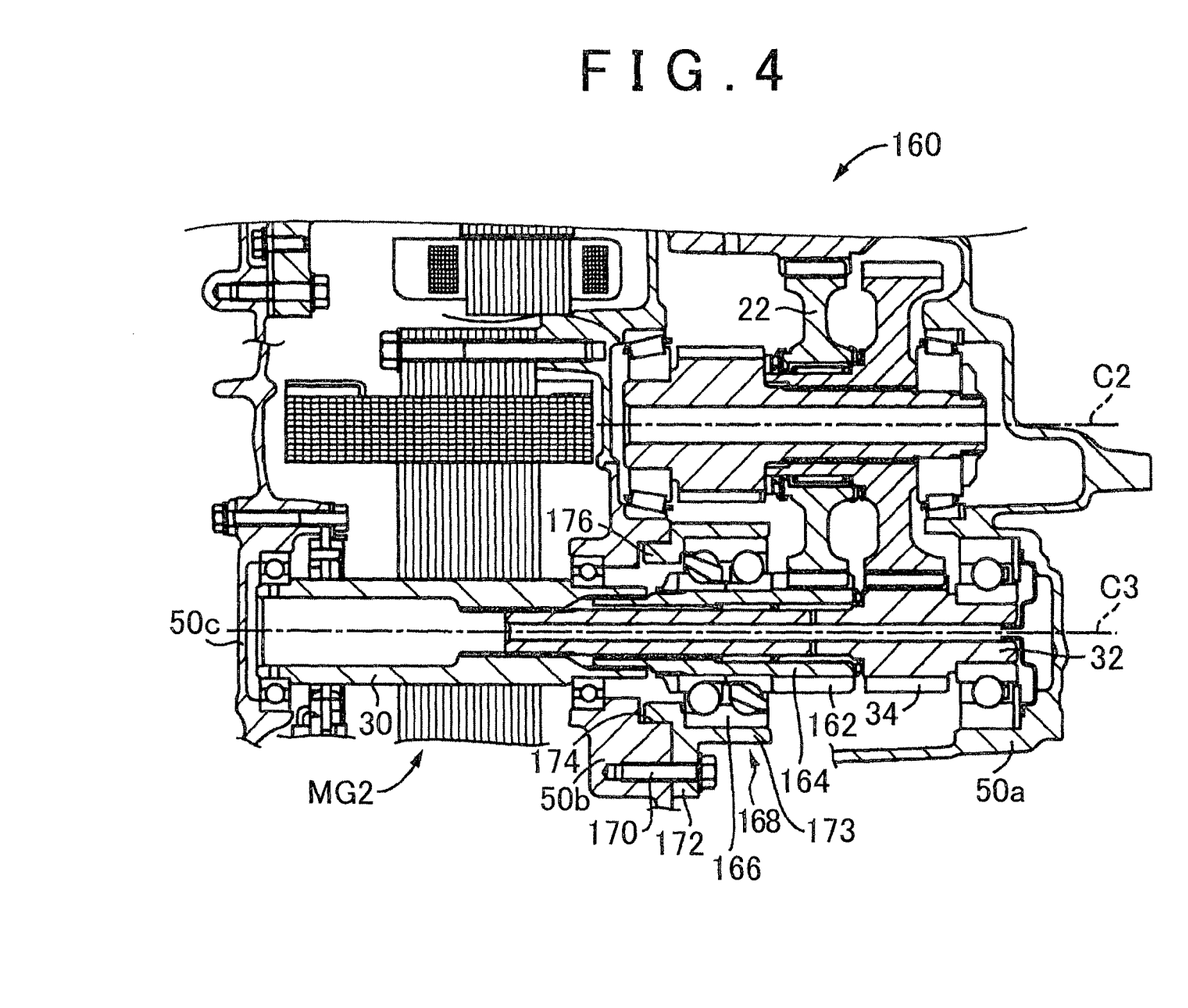
FIG. 4 is a cross-sectional view of a drive device that is yet another example of the present invention.

FIG. 4 is a cross-sectional view of a drive device 160 for a hybrid vehicle (a drive device 160) that is yet another example of the present invention and corresponds to the above-described examples in FIG. 2 and FIG. 3. When the drive device 160 in FIG. 4 is compared to the above-described drive device 10, the drive device 160 differs from the drive device 10 in a point that a member for supporting a double-row angular bearing is configured as a separate body. However, the rest of the configuration of the drive device 160 is basically the same as that of the drive device 10. A description will hereinafter be made on a supporting mechanism of the double-row angular bearing that differs from the supporting mechanism in the drive device 10.

Also, in the drive device 160, a driven gear shaft 164, on which a driven gear 162 is formed, is supported to be rotatable about the third rotational axis C3, the power being transmitted from the idler gear 22 to the driven gear 162. The driven gear shaft 164 is supported in a cantilevered state by a double-row angular bearing 166 that is configured by including two bearings. Noted that the double-row angular bearing 166 is an example of the fourth bearing device of the present invention.

Figure 5:
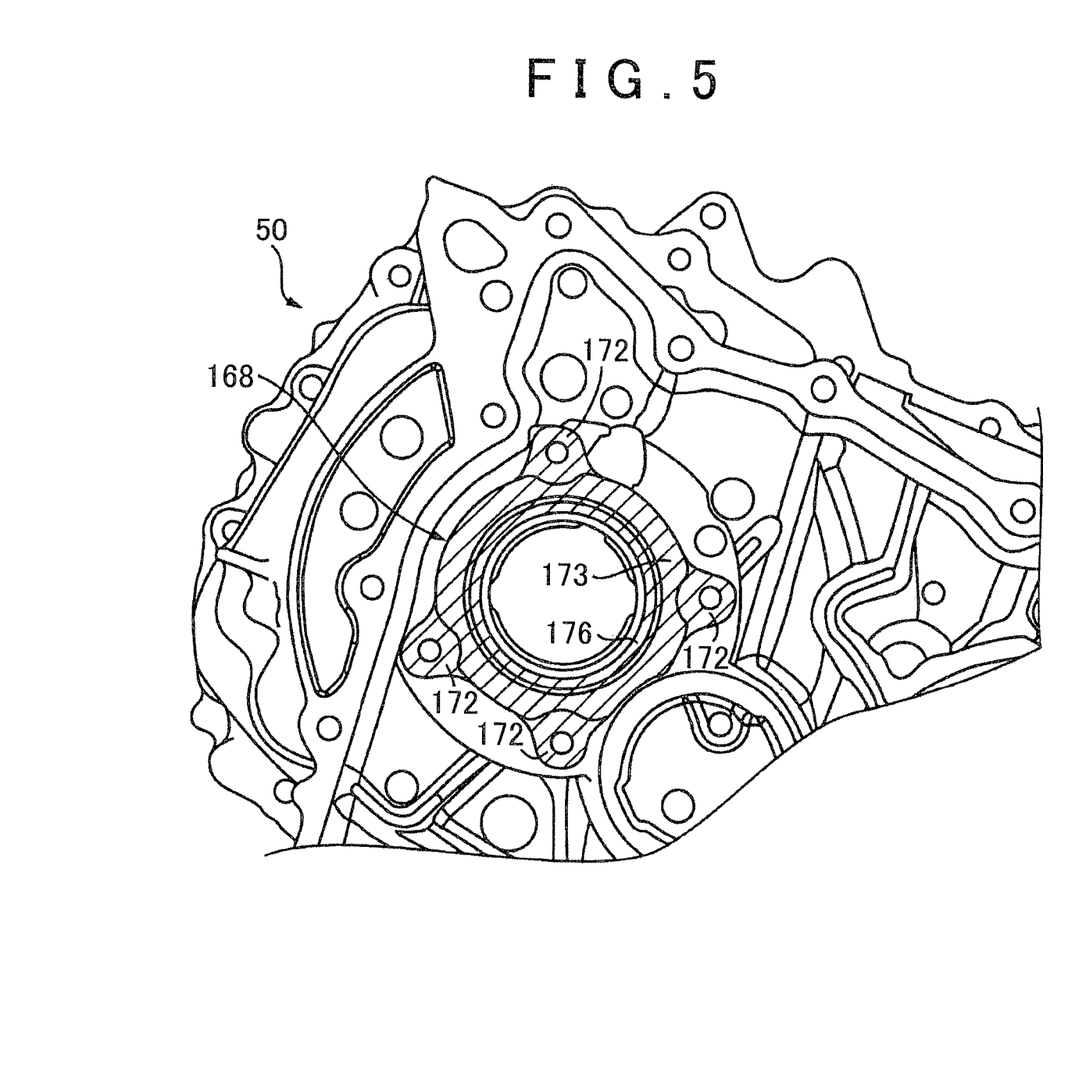
FIG. 5 is a view of a state that a retainer in FIG. 4 is fixed to a case.

Here, the double-row angular bearing 166 is supported by a retainer 168 that is fixed to the case 50 (the second case 50*b*). The retainer 168 is formed in a cylindrical shape, and flange sections 172 are provided at plural positions in a peripheral direction on an outer periphery of the retainer 168, each of the flange sections 172 protruding in a radial direction to fix the retainer 168 to the case 50 by a bolt 170. In addition, a tubular section 173 in a cylindrical shape is provided to retain the double-row angular bearing 166. FIG. 5 shows a state that the retainer 168 is fitted to the case 50 (the second case 50*b*). A portion with diagonal lines in FIG. 5 corresponds to the retainer 168. As shown in FIG. 5, the flange sections 172 are provided at four positions in the peripheral direction, and each of the flange sections 172 has a bolt hole for fastening the bolt.

In addition, a circular boss 176 that is fitted to an annular hole 174 is provided on an inner periphery on a side connected to the case 50 in an axial direction of the retainer 168, the annular hole 174 being provided in the case 50. Since this boss 176 is provided, a step section is also provided on an outer peripheral side of the retainer 168. The bolt 170 is fastened in a state that the step section of this boss 176 is fitted to a step section provided by the annular hole 174 of the case 50. Accordingly, the retainer 168 is fixed to the case 50. Since the step sections of this boss 176 and the annular hole 174 are fitted to each other, aligning accuracy of the retainer 168 is high, and thus a knock pin or the like is unnecessary. Furthermore, since the retainer 168 is formed of cast iron or the like, for example, supporting rigidity thereof can be increased in comparison with a case where the retainer 168 is formed of an aluminum alloy.

Since the retainer 168 is a separate body from the case 50, the retainer 168 is not influenced by restriction of casting, and an axial length of the tubular section 173 of the retainer 168 can be increased. When the tubular section 173 of the retainer 168 extends in the axial direction, a distance in the axial direction between the driven gear 162 and the double-row angular bearing 166 of the driven gear shaft 164 can be reduced. Also in this example, the distance in the axial direction between the double-row angular bearing 166 in FIG. 4 and the driven gear 162 is reduced when compared to the double-row angular bearing 60 in FIG. 2. As described above, when the distance in the axial direction between the double-row angular bearing 166 and the driven gear 162 is reduced, a bearing load applied on the double-row angular bearing 166 is reduced. Thus, the double-row angular bearing 166 can be downsized.

Noted that, in the above-described structure in FIG. 2, in which the case 50 and a support section of the double-row angular bearing 60 are integrated, there is a limitation on extension of the axial length of the support section. This is because, in order to prevent interference of the support section during an assembling process in the line, the length of the support section is limited to such a degree that the support section does not protrude from a mating surface of the case. On the contrary, upon assembly of the drive device 160, the motor chamber side is first assembled, and then the gear chamber side is assembled. Since the retainer 168 is assembled to the case 50 immediately before the assembly of the gear chamber side, the tubular section 173 of the retainer 168 can be extended in the axial direction without the above-described limitation being applied thereto.

As described above, substantially the same effects as those obtained by the above-described examples can be obtained by this example. Particularly, since the double-row angular bearing 166 is supported via the retainer 168, which is fixed to the case 50 as the non-rotational member and is the separate body, the following effect can be obtained. For example, since the retainer 168 is formed of the cast iron, the supporting rigidity for supporting the double-row angular bearing 166 can further be increased. In addition, since the tubular section 173 of the retainer 168 can be extended in the axial direction, it is possible to reduce the distance in the axial direction between the double-row angular bearing 166 and the driven gear 162. In this way, a load applied to the double-row angular bearing 166 is reduced. As a result, the double-row angular bearing 166 can be downsized.

Figure 6:
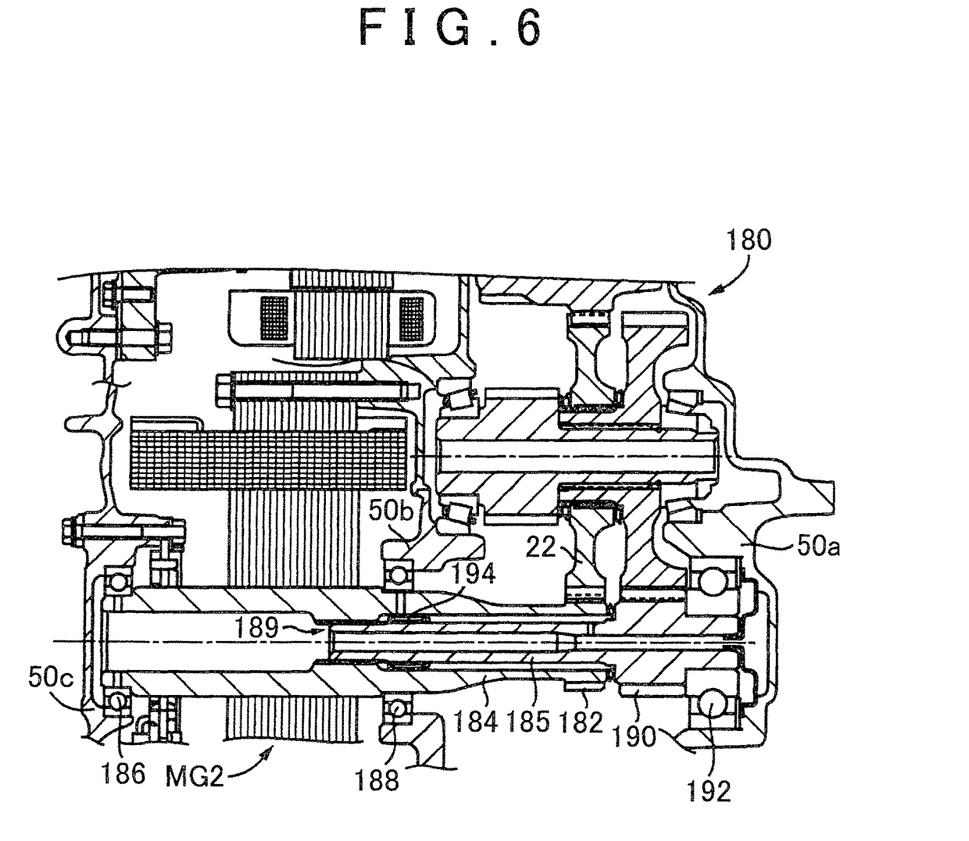
FIG. 6 is a cross-sectional view of a drive device that is further another example of the present invention.

FIG. 6 is a cross-sectional view of a drive device 180 for a hybrid vehicle (a drive device 180) that is further another example of the present invention. When the drive device 180 is compared to the above-described drive device 10 in FIG. 2, the drive device 180 differs from the drive device 10 in a point that a driven gear shaft and a rotor shaft are integrally molded. A description will hereinafter be made on a supporting structure around the third rotational axis C3 that differs from that of the drive device 10.

A power transmission shaft 184, on which a driven gear 182 is formed, is arranged around the third rotational axis C3, so as to be rotatable about the third rotational axis C3, the driven gear 182 meshing with the idler gear 22. The power transmission shaft 184 has a cylinder shape, and an output shaft 185 is arranged on an inner peripheral side thereof, so as to be rotatable about the third rotational axis C3.

The power transmission shaft 184 is a rotational shaft that is configured that the driven gear shaft and the rotor shaft of the second motor MG2 in the above-described example are integrally molded. The power transmission shaft 184 is rotatably supported by a ball bearing 186 at an end on the third case 50c side in an axial direction of the power transmission shaft 184, and is further rotatably supported by a ball bearing 188 that is arranged at a position approximately at the center in the axial direction of the power transmission shaft 184 (a position where the power transmission shaft 184 overlaps the second case 50b in a radial direction). Since the power transmission shaft 184 is supported by these ball bearings 186, 188, supporting rigidity thereof is secured. Noted that the ball bearing 188 is an example of the first bearing device of the present invention.

The output shaft 185 is arranged on the inner peripheral side of the power transmission shaft 184. Since an end on the third case 50c side in an axial direction of the output shaft 185 is spline-fitted to an inner periphery of the power transmission shaft 184, a fitted section 189 that connects the power transmission shaft 184 and the output shaft 185 to allow the power transmission therebetween is provided. In addition, an output gear 190 is formed on an outer periphery on the first case 50a side in the axial direction of the output shaft 185. An outer peripheral end on the first case 50a side in the axial direction of the output shaft 185 is rotatably supported by a ball bearing 192. Furthermore, a needle bearing 194 that supports the output shaft 185 to allow rotation thereof is arranged between an outer periphery of the output shaft 185 and an inner periphery of the power transmission shaft 184. The output shaft 185 is rotatably supported by these ball bearing 192 and needle bearing 194. As described above, since the power transmission shaft 184 and the output shaft 185 are each independently supported, supporting rigidity of each of the rotational shafts is increased. Thus, the vibration and the noise during the power transmission are suppressed. Noted that the ball bearing 192 is an example of the second bearing device of the present invention. The needle bearing 194 is an example of the third bearing device.

In the axial direction, the needle bearing 194 is arranged at a position where it overlaps the ball bearing 188, which supports the power transmission shaft 184, in a radial direction. As described above, since the ball bearing 188 and the needle bearing 194 overlap each other in the radial direction, the supporting rigidity of the needle bearing 194 is increased. Thus, the vibration and the noise during the power transmission are further suppressed.

As described above, according to this example, the power transmission shaft 184, for which the rotor shaft and the driven gear shaft are integrally molded, is used. Thus, the double-row angular bearing, which is provided in the case where the rotor shaft and the driven gear shaft are separate bodies, needs not be provided.

The examples of the present invention have been described in detail so far on the basis of the drawings. However, the present invention is also applied to other modes.

For example, in the drive device 10 of the above-described example, the needle bearing 72 is arranged at the position where it overlaps the double-row angular bearing 60 in the radial direction. Instead, the needle bearing 72 may be arranged at a position where it overlaps the ball bearing 68 in the radial direction. In addition, in the drive device 100, the needle bearing 138 is arranged at a position where it overlaps the double-row angular bearing 128 in the radial direction. Instead, the needle bearing 138 may be arranged at a position where it overlaps the ball bearing 126. In addition, in the above overlapping in the radial direction, portions of the bearings may overlap each other.

In the drive device 180 of the above-described example, the power transmission shaft 184, in which the rotor shaft and the driven gear shaft are integrally molded, is adopted. Instead, it may be configured such that the rotor shaft and the output shaft are integrally molded, that the driven gear shaft is arranged on the inner peripheral side of the rotational shaft, and that the driven gear shaft is fitted to the rotational shaft.

The drive device 100 of the above-described example may have a structure that the double-row angular bearing 128 is supported by a retainer that is formed as a separate body.

The drive devices 10, 100, 160, 180 of the above-described examples are each the drive device of front-engine, front-wheel-drive type (FF type). However, the drive, devices 10, 100, 160, 180 can each appropriately be applied as a drive device of another type, such as RR type.

Noted that what has been described above is merely one embodiment. The present invention can be carried out in modes in which various modifications and changes are made thereto on the basis of knowledge of those skilled in the art.

What is claimed is:

1. A drive device for a hybrid vehicle, the hybrid vehicle including an engine, at least one drive wheel, and a motor arranged on a different rotational axis from a rotational axis of the engine, the drive device comprising:
   a driven gear shaft arranged to be rotatable about a rotational axis that is shared with a rotor shaft of the motor, the driven gear shaft being connected to the rotor shaft of the motor to allow power transmission between the driven gear shaft and the rotor shaft;
   a driven gear configured to receive power from the engine, the driven gear being provided on the driven gear shaft;
   an output shaft arranged to be rotatable about the rotational axis that is shared with the rotor shaft of the motor, at least a portion of the output shaft being arranged at a position where the portion overlaps the driven gear shaft in a radial direction of the output shaft, the output shaft being connected to the rotor shaft to allow power transmission between the output shaft and the rotor shaft, and the output shaft being connected to the drive wheel to allow power transmission between the output shaft and the drive wheel;
   a first bearing device that rotatably supports the rotor shaft of the motor on a driven gear side in an axial direction of the rotor shaft;
   a second bearing device that rotatably supports one of the driven gear shaft and the output shaft, the one of the driven gear shaft and the output shaft being arranged radially inward of the other one of the driven gear shaft and the output shaft; and
   a third bearing device arranged between an outer periphery of the one of the driven gear shaft and the output shaft and an inner periphery of the rotor shaft or an inner periphery of the other one of the driven gear shaft and the output shaft, the third bearing device that rotatably supports the one of the driven gear shaft and the output shaft.

2. The drive device according to claim 1, further comprising:
   a fourth bearing device that rotatably supports the other one of the driven gear shaft and the output shaft, the fourth bearing device being arranged at a position where at least a portion of the fourth bearing device overlaps the third bearing device in a radial direction of the fourth bearing device.

3. The drive device according to claim 2, wherein the fourth bearing device is fixed to and supported by a case that is a non-rotational member.

4. The drive device according to claim 3, wherein the driven gear shaft is arranged on an outer peripheral side of the output shaft,
   the output shaft is fitted to the rotor shaft, the output shaft is connected to the rotor shaft to allow power transmission between the output shaft and the rotor shaft, the output shaft is supported by the second bearing device,
   the third bearing device is arranged between an outer periphery of the output shaft and an inner periphery of the driven gear shaft,
   the driven gear shaft is rotatably supported in a cantilevered state on a motor side in an axial direction of the driven gear shaft by the fourth bearing device, and
   the fourth bearing device includes at least two bearings.

5. The drive device according to claim 4, wherein the fourth bearing device is supported by a retainer, and the retainer is fixed to a case as the non-rotational member.

6. The drive device according to claim 4, further comprising:
   a thrust bearing that is arranged between the driven gear shaft and the output shaft in the axial direction of the driven gear shaft, the thrust bearing being arranged to receive an axial load between the driven gear shaft and the output shaft in the axial direction of the driven gear shaft.

7. The drive device according to claim 3, wherein the driven gear shaft is arranged on an inner peripheral side of the output shaft,
   the driven gear shaft is fitted to the rotor shaft, the driven gear shaft is connected to the rotor shaft to allow power transmission between the driven gear shaft and the rotor shaft, the driven gear shaft being supported by the second bearing device,
   the third bearing device is arranged between an outer periphery of the driven gear shaft and an inner periphery of the output shaft,
   the output shaft is rotatably supported in a cantilevered state on a motor side in an axial direction by the fourth bearing device, and
   the fourth bearing device includes at least two bearings.

8. The drive device according to claim 1, wherein the third bearing device is a needle bearing.

9. The drive device according to claim 1, wherein the drive gear shaft is arranged on an outer peripheral side of the output shaft,
   the output shaft is fitted to the rotor shaft, the output shaft is connected to the rotor shaft to allow power transmission between the output shaft and the rotor shaft, and
   the rotor shaft is integrated with the driven gear shaft.

10. The drive device according to claim 9, wherein the first bearing device and the third bearing device are arranged such that at least a portion of the first bearing device overlaps at least a portion of the third bearing device in a radial direction.

* * * * *